United States Patent
Nagashima

(10) Patent No.: US 6,704,379 B1
(45) Date of Patent: Mar. 9, 2004

(54) INTERMITTENT RECEIVING SYSTEM

(75) Inventor: Noriaki Nagashima, Shizuoka (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/551,328

(22) Filed: Apr. 18, 2000

(30) Foreign Application Priority Data

Apr. 20, 1999 (JP) .......................................... 11-112505

(51) Int. Cl.[7] .............................................. H04L 7/00
(52) U.S. Cl. ....................... 375/355; 370/503; 327/144; 375/316
(58) Field of Search ................... 375/354, 355, 375/316, 338, 340, 377; 370/503; 327/141, 144, 151, 291

(56) References Cited

FOREIGN PATENT DOCUMENTS

| EP | 0726 687 | 8/1996 |
|---|---|---|
| GB | 2 324 681 | 10/1998 |
| JP | 08-307304 | 11/1996 |
| JP | 9-153854 | 6/1997 |
| JP | 9-321687 | 12/1997 |
| JP | 09-321694 | 12/1997 |
| JP | 10-107730 | 4/1998 |
| JP | 10-117164 | 5/1998 |
| JP | 2000-224100 | 8/2000 |
| WO | WO 98/5460 | 12/1998 |

OTHER PUBLICATIONS

Japanese Official Action dated Feb. 1, 25, 2002 (with translation of the relevant portions).

*Primary Examiner*—Jean B. Corrielus
(74) *Attorney, Agent, or Firm*—Dickstein, Shapiro, Morin & Oshinsky, LLP.

(57) ABSTRACT

The demodulator executes a demodulating process on a received radio signal, and generates a demodulation clock in the demodulating process. The first clock oscillator generates a high-rate clock which is at a high rate compared to the demodulation clock. The second clock oscillator generates a low-rate clock which is at a low rate compared to the demodulation clock. The timing generator estimates a rise time of the demodulation clock corresponding to the next reception timing in intermittent reception. Furthermore, the timing generator controls the first clock oscillators substantially in synchronism to the rise time of the demodulation clock.

14 Claims, 3 Drawing Sheets

FIG. 3A - PRIOR ART
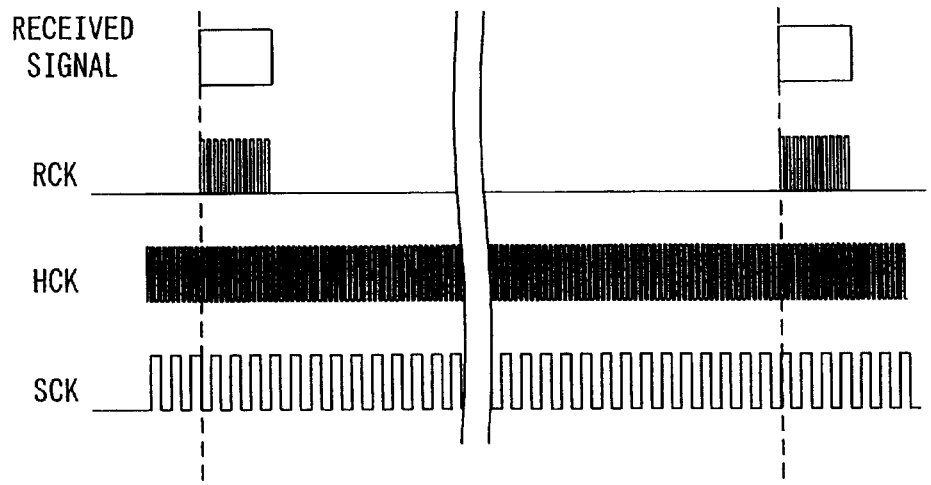
FIG. 3B - PRIOR ART
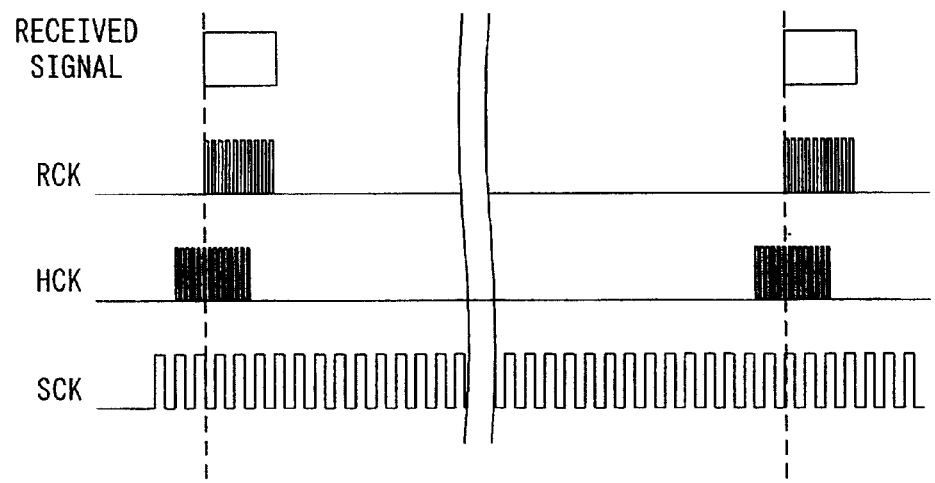
FIG. 3C
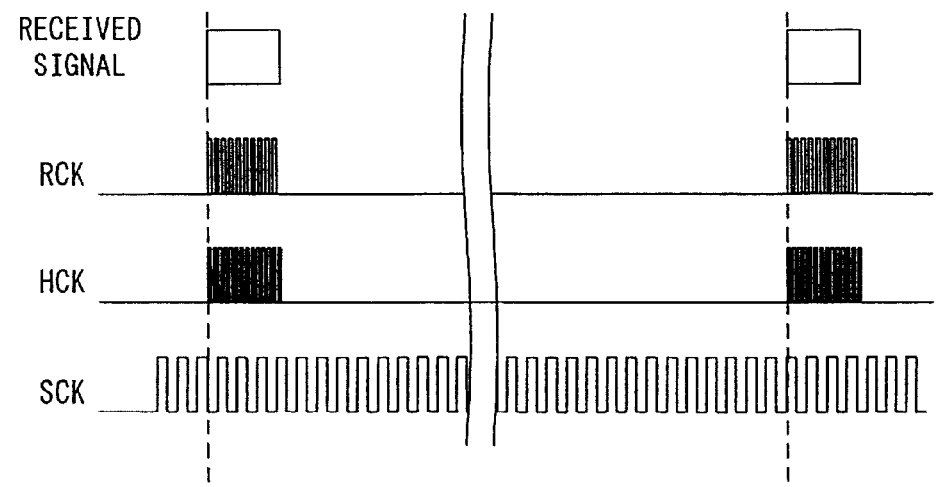

INTERMITTENT RECEIVING SYSTEM

BACKGROUND OF THE INVENTION

The present invention relates to intermittent receiving systems and, more particularly, to intermittent receiving systems which can be used as mobile communication terminal with reduced power consumption.

Mobile communication terminals of PHS (Personal Handy-Phone System), PDC (Personal Digital Cellular) system, etc. are popularly used. The mobile communication terminal is required to be operable for a long time when it is charged once. The intermittent reception is known as a receiving method for reducing power consumption during a waiting operation, which occupies a majority of the operating time.

In the PDC system, a frame synchronization symbol is provided in a central part of a transmission signal. Therefore, it is necessary to maintain a reception clock even during the non-receiving time or adopt a reception clock reproducing system, which is high in level with respect to the leading part of the transmission signal. In the former case, the power consumption is increased. In the latter case, the circuit construction is greatly complicated. In addition, the reliability of the demodulating process is deteriorated.

In the PHS system, the bit synchronization signal is sufficiently provided in the first half of the transmission signal. It is thus possible to adopt a simplified reception clock reproducing system. On the downside side, however, an excessively long receiving process time is required.

As prior art pertaining to the present invention, Japanese Patent Laid-Open No. 10-117164 and Japanese Patent Laid-Open No. 9-321687 disclose means for intermittently on-off operating the power supply of a receiving part. Also, Japanese Patent Laid-Open No. 9-153854 discloses a system, which includes high- and low-rate clock oscillators for generating a high- and a low-rate clock, respectively. In this system, during a waiting time the internal circuit executes an operation under control of the low-rate clock, thus reducing the power consumption.

The intermittent receiving system is required to suppress current consumption during a non-receiving time section for reducing the current consumption in an intermittent receiving operation, operate the receiving system circuit for a time which is as close to a time section with a desired received signal present therein as possible and ensure freedom from receiving performance deterioration.

Where the high- and low-rate clocks are used in a switching fashion, a demodulation clock used in the receiving system circuit should be accurately timed to the received signal arrival timing. In the prior art intermittent reception, therefore, stable operation of the high-rate clock oscillator is necessary at the time of the demodulation clock rise.

When the high-rate clock oscillator rise timing is earlier than the demodulation clock oscillator rise timing, extra power is consumed. On the other hand, when the high-rate clock oscillator rise timing is later than the demodulation clock oscillator rise timing, erroneous reception is likely.

In view of the above background, an intermittent receiving system capable of reducing power consumption in the intermittent receiving process, is desired. In addition, an intermittent receiving system is desired, in which the reduction of the power consumption is realized in connection with the process in the intermittent receiving operation and the process prior thereto, is desired.

Furthermore, an intermittent receiving system is desired, in which the process in the intermittent receiving operation is realized such that the high-rate clock oscillator rise operation is substantially synchronized to the demodulation clock oscillator rise operation.

Still further, an intermittent receiving system is desired, in which the above substantial synchronizing process is executed according to a value obtained by calculation which is executed before the intermittent receiving operation.

Yet further, an intermittent receiving system is desired, in which the next signal receiving timing can be estimated according to the counts of pulses of the high- and low-rate clocks.

Further, an intermittent receiving system is desired, in which the operation of the high-rate clock oscillator is executed in response to the operation of the demodulation clock oscillator according to a predicted receiving timing.

SUMMARY OF THE INVENTION

An object of the present invention is to provide an intermittent receiving system capable of reducing power consumption in the intermittent receiving process.

Another object of the present invention is to provide an intermittent receiving system, in which the reduction of the power consumption is realized in connection with the process in the intermittent operation and the process prior thereto.

A further object of the present invention is to provide an intermittent receiving system, in which the process in the intermittent receiving operation is realized such that the high-rate clock oscillator rise operation is substantially synchronized to the demodulation clock oscillator rise operation.

A still further object of the present invention is to provide an intermittent receiving system, in which the above substantial synchronizing process is executed according to a value obtained by calculation which is executed before the intermittent receiving operation.

A yet further object of the present invention is to provide an intermittent receiving system, in which the next signal receiving timing can be estimated according to the counts of pulses of the high- and low-rate clocks.

A further object of the present invention is to provide an intermittent receiving system, in which the operation of the high-rate clock oscillator is executed in response to the operation of the demodulation clock oscillator according to a predetermined receiving timing.

According to an aspect of the present invention, there is provided an intermittent receiving system comprising: a demodulating unit for executing a demodulating process on a received radio signal, the demodulating unit generating a demodulation clock in the demodulating process; a first clock generating unit for generating a high-rate clock compared to the demodulation clock; a second clock generating unit for generating a low-rate clock compared to the demodulation clock; and a timing control unit for estimating the timing of rise of the demodulation clock corresponding to the next reception timing in intermittent reception and controlling the first clock unit substantially in synchronism to the demodulation clock rise timing.

The timing control unit calculates the intermittent receiving interval according to the counts of pulses of the high- and low-rate clocks.

The timing control unit determines the intermittent receiving interval by calculating the interval of a particular instant signal contained in the received radio signal according to the counts of pulses of the high- and low-rate clocks.

When the particular instant signal is not present at the leading part of the received signal, the timing control calculates the relation between the forefront instants leading portion of the particular instant signal and the received radio signal according to the counts-of pulses of the low- and high-rate clocks and synchronizes the demodulation clock to the forefront instant leading part of received signal by shifting the demodulation clock generation timing according to calculated counts.

The timing control unit causes the operation of the first clock generating unit to be started before the demodulation clock generation timing.

According to another aspect of the present invention, there is provided an intermittent receiving method comprising: a step of generating a demodulation clock; a step of executing a demodulating process on a received radio signal; a step of generating a high-rate clock at a high rate compared to the demodulation clock; a step for generating a low-rate clock at a low rate compared to the demodulation clock; a step of estimating the timing of rise of the demodulation clock corresponding to the next reception timing in intermittent reception; and a step of generating the high-rate clock substantially synchronized to the demodulation clock generation timing on the basis of the estimated timing.

In the estimating the intermittent reception interval is calculated according to the counts of the high- and low-rate clocks.

In the step of calculating the intermittent receiving interval the interval of a particular instant signal contained in the received radio signal is calculated according to the counts of the pulses of the high- and low-rate clocks.

The step of calculating the intermittent receiving interval includes: a step of calculating the relation between the leading parts of the particular instant signal and the received radio signal according to the counts of the pulses of the low- and high-rate clocks when the, particular instant signal is not present at the leading part of the received radio signal; and a step of synchronizing the demodulation clock to the leading part of the received radio signal by shifting the demodulation clock generation timing according to calculated counts.

In the step of generating the high-rate clock the operation of generating the high-rate clock is started before the demodulation clock generation timing.

Other objects and features will be clarified from the following description with reference to attached drawings.

BRIEF DESCRIPTION OF THE DRAWINGS

FIGS. 3A and 3B are time charts illustrating prior art examples of intermittent receiving operations; and FIG. 3C is an example of the intermittent receiving operation according to the present invention.

PREFERRED EMBODIMENTS OF THE INVENTION

Preferred embodiments of the present invention will now be described with reference to the drawings.

Figure 1:
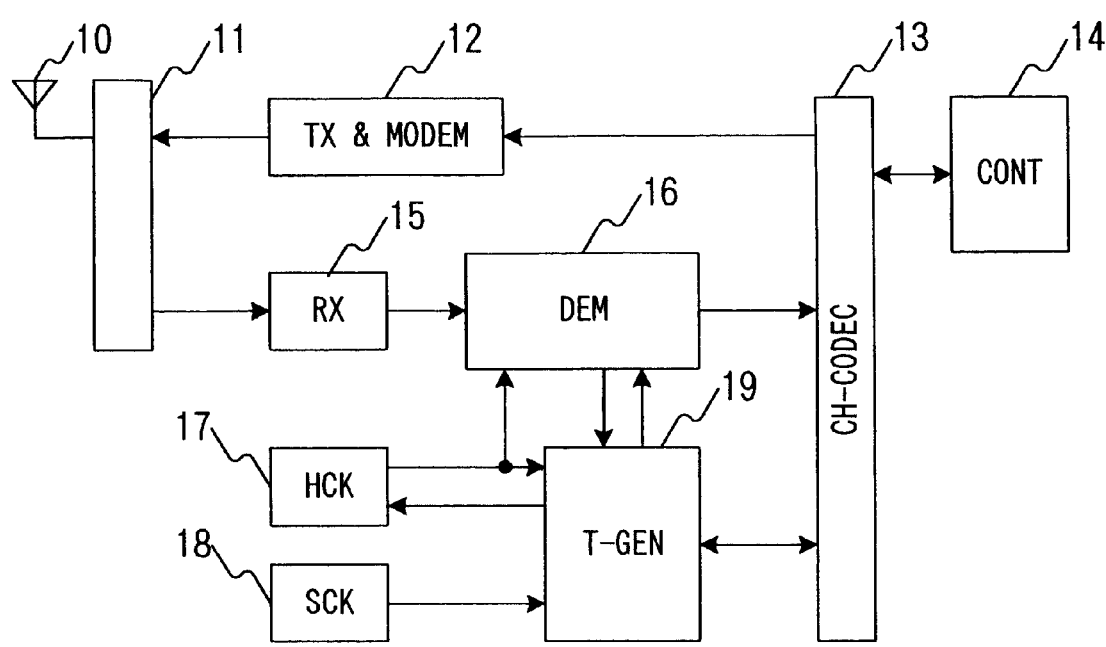
FIG. 1 is a block diagram showing a first embodiment of the intermittent receiving system according to the present invention.

FIG. 1 is a block diagram showing a first embodiment of the intermittent receiving system according to the present invention. In this specification, the term "intermittent receiving system" is applied to a mobile communication terminal for executing an intermittent receiving process.

The intermittent receiving system comprises an antenna 10, an antenna duplexer 11, a radio transmitter/receiver (TX/MODEM) 12, a channel code unit (CH-CODIC) 13, a controller (CONT) 14, a radio receiver (RX) 15, a demodulator (DEM) 16, a high-rate clock oscillator (HCK) 17, a low-rate clock oscillator (LCK) 18 and a timing generator (T-GEN) 19.

The antenna 10 transmits and receives a radio signal (not shown). The antenna duplexer 11 switches processes of 8 transmitting and receiving the radio signal. The radio transmitter/modulator 12 modulates the transmission data and outputs a transmission signal in a radio frequency band.

The demodulator 16 includes a demodulation clock generating means for generating a demodulation clock signal. The channel codec unit 13 includes a voice data/digital data processing unit. The control unit 14 controls the processing in the time intermittent receiving system according to a control program for the operation in the present invention. The control program is stored in a storing means (not shown) connected to the control unit 14.

The low-rate clock oscillator 18 is normally held operative for a clock or like service. The low-rate clock oscillator 18 consumes very little power, although it is low in frequency stability, temperature deviation and reliability. The low-rate clock oscillator 18 maintains a certain reliability for a long time, and is stable for a short period of time.

The short time stability of the low-rate clock oscillator 18 is set to be shorter than a reference time. The reference time is determined such that the time sum of a time, which is represented by the product of the short-time stability of the intermittent receiving interval of the low-rate clock oscillator 18 and the intermittent receiving interval, and a time corresponding to one clock pulse of the high-rate clock 9 oscillator 17, is within the time difference between the phases of the demodulation clock and the received signal.

In this embodiment, the time of the short time stability of the low-rate clock oscillator 18 is set to a time corresponding to an interval of appearance of several clock pulses of the high-rate clock oscillator 17.

The high-rate clock oscillator 17 is oscillated at a sufficiently high frequency compared to the modulation signal rate. The oscillation frequency of the high-rate clock oscillator 17 is stabilized in a short period of time from the power-"on". The high-rate clock oscillator 17 consumes great power compared to the power consumption in the low-rate clock oscillator 18.

In this embodiment, as the high-rate clock oscillator 17, an oscillator is adopted which is sufficiently high in the frequency reliability and the stability from the consideration of the circuit overlap. As will be described later, an oscillator which is satisfactory in that the oscillating frequency is sufficiently high and stabilized in a short periods of time, can be used as the high-rate clock oscillator 17.

The channel codec unit 13 and the timing generator 19 are desirably constructed together as an integral construction. Also, the radio transmitter/modulator 12 and the demodulator 16, and further the controller 14, are desirably constructed together as an integral construction.

The timing generator 19 controls the power on-off and stand-by states of the radio transmitter/modulator 12, the channel codec unit 13, the radio receiver 15, the demodulator 16 and the high-rate clock oscillator 17.

Prior to the intermittent receiving operation, the timing generator 19 measures the intermittent receiving interval. The intermittent receiving interval is calculated such that it can be expressed by the counts of the high- and low-rate clock oscillators 17 and 18. The intermittent receiving interval is estimated so as to reproduce the timing of the rise of a reception clock reproduced in the demodulator 16.

Prior to the intermittent receiving operation, the timing generator 19 calculates the time until a reception clock rise timing. The reception clock rise timing corresponds to a leading symbol of the received signal at the next reception timing. This time until the reception clock rise timing is calculated from the counts of the high- and low-rate clock oscillators 17 and 18.

The count of the high-rate clock oscillator 17 is set separately in a time section from the timing of setting-in of the intermittent receiving operation till the low-rate clock rise and in a time section from the count-out of a predetermined count number of low-rate clock pulses till the next reception clock rise timing.

The timing generator 19 is controlled such that the demodulation clock of the demodulator 16 rises when the count in each time section has been counted out.

During the intermittent receiving operation, the timing generator 19 measures the intermittent receiving interval. The intermittent receiving interval is calculated from the counts of the high- and low-rate clock oscillators 17 and 18. The intermittent receiving interval is estimated so as to reproduce the timing of a rise of a reception clock generated in the demodulator 16.

At this time, the timing generator 19 calculates the intermittent receiving interval by using the newest counts in the high- and low-rate clock oscillators 17 and 18.

The timing generator 19 also turns on power to the receiving system circuits (15, 16 and 17) right before the reception timing. The timing generator 19 causes the channel codec unit 13 to start a demodulation signal process at the above estimated timing. The estimated timing is calculated to be a minimum necessary time in a measurement bases on clock pulse number.

At the time of the intermittent receiving operation, the timing generator 19 turns on power to the receiving system circuits (15, 16 and 17) right before the reception timing. The timing generator 19 causes the channel codec unit 13 to start the demodulation signal process at the estimated timing.

The timing generator 19 turns off power to the receiving system circuits (15, 16 and 17) when the signal 12 reception is over or at the end of the signal reception timing. The timing generator 19 causes the channel codec unit 13 to discontinue the demodulation signal process at the estimated timing.

Figure 2:
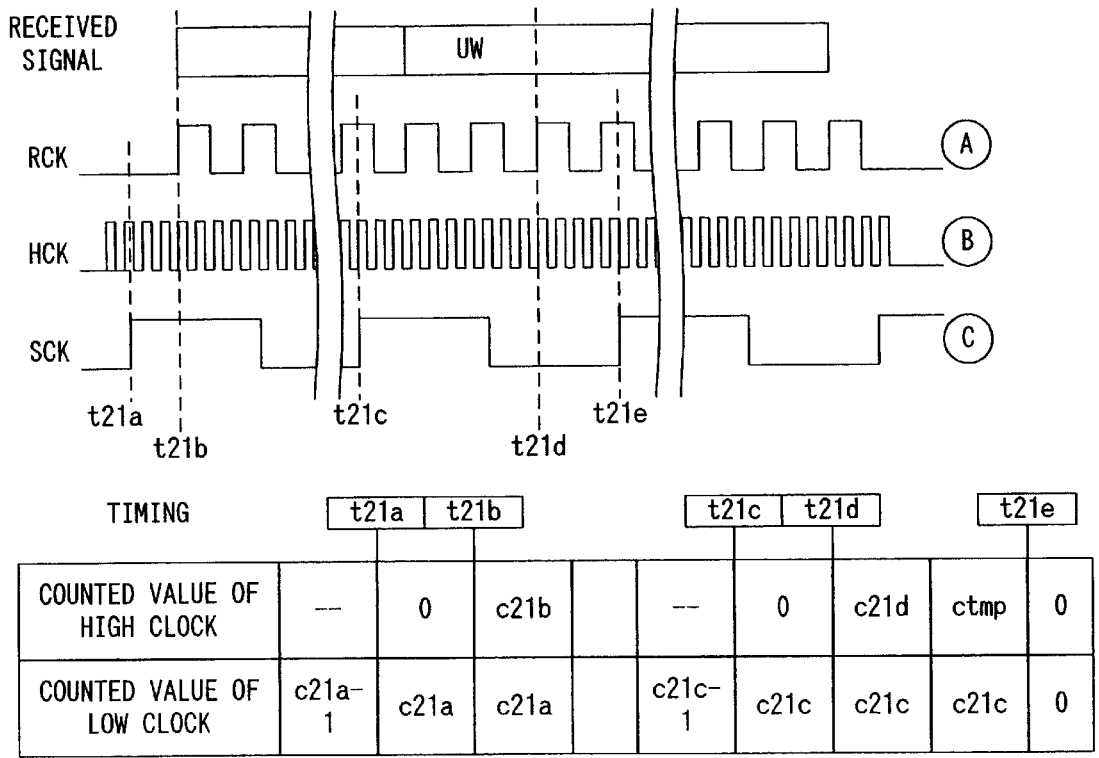
FIG. 2 is a timing chart for describing the operation of the embodiment of the intermittent receiving system.
Figure 2:
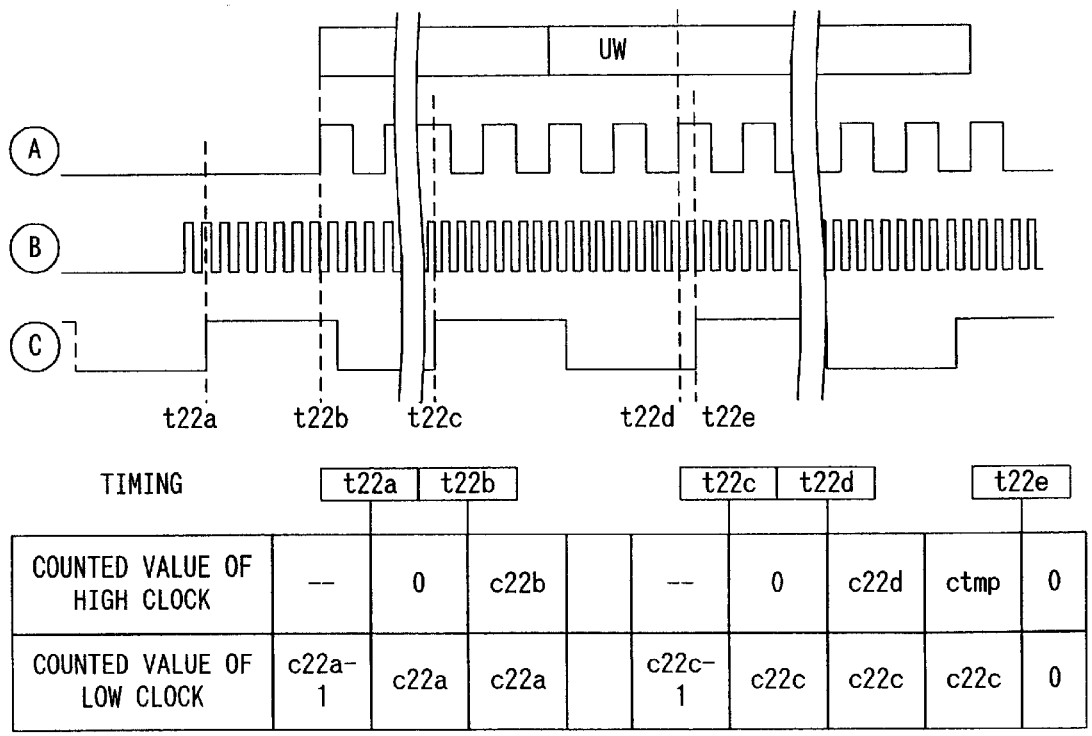

FIG. 2 is a timing chart for describing the operation of the embodiment of the intermittent receiving system.

Referring to the Figure, labeled "RCK" is the demodulation clock waveform, "HCK" the high-rate clock waveform, and "SCK" the low-rate clock waveform. Labeled "UW" word synchronizing signal contained in the received signal.

In the intermittent receiving state, the timing generator 19 counts high-rate clock pulses. In response to the rise of the low-rate clock, the timing generator 19 tentatively stores the count of the high-rate clock pulses as "ctmp" and resets the count.

The timing generator 19 normally counts low-rate clock pulses until the resetting of the count at a time to be described later.

The timing generator 19 causes the high-rate clock oscillator 17 to start oscillation in such a manner that the output of the high-rate clock oscillator 17 is stabilized until time "t21b" of appearance of the received signal.

The timing generator 19 causes the high-rate clock oscillator 17 to start operation such that the demodulation clock rises in correspondence to the first bit of the received signal at time t21b corresponding to the count "c21b" of high-rate clock pulses (i.e., count "3" in FIG. 2), which are estimated to be necessary from the low-rate clock rise stored as count "c21a" corresponding to time t21a till time "t21b".

This control operation is possible in that in received signal immediately preceding the illustrated received signal the counts of low- and high-rate clock pulses can be estimated in a procedure to be described later.

The timing generator 19 stores the counts "c21c" and "c21d" of low- and high-rate clock pulses at a particular position of the received signal (i.e., position of detection of "UW" in FIG. 2), and resets the count of low-rate clock pulses.

The timing generator 19 estimates the time of rise of the next low-rate clock pulses. The timing generator 19 calculates the count "c22a" of low-rate clock pulses at time "t22a" and the count "c22b" of high-rate clock pulses from time "t22a" till time "t22b" for the start of reception of the net received signal from the counts "c20c" and "c20d" of low- and high-rate clock pulses at a partition position of the immediately preceding received signal, above counts "c21a" to "c21d" and tentatively stored count "ctmp" of high-rate clock pulses, and stores the calculated counts. At the end of the above calculation, it is not necessary to store the counts "c20c" and "c20d".

The intermittent receiving interval, in its expression by counts of low- and high-rate clock pulses, is given as count "c21d" of low-rate clock pulses and counts "c21d–c20d" of high-rate clock pulses.

At time "t21d", the count of low-rate clock pulses is reset to "0". This count can be virtually regarded to be "0" at timing "t21c" as well.

From the above, it will be seen that the time expressed by the counts from time "t21c" till timing "t22d" at the particular position in the next received signal, is equal to the counts at timing "t21d". The time is thus given as count "c21c" of low-rate clock pulses and count set "c21d–c20d" of high-rate clock pulses.

Instant "t22d" necessary for reception of the next signal is earlier than time "t22b" by time set "t21d–t21b". Thus, when time from time "t21d" till time "t231d" is expressed by counts, a time earlier by count set "c21c–c21a" of low-rate clock pulses and count set "c21d–c21b" of high-rate clock pulses is set.

The count "c22a" of low-rate clock pulses at time "t22a" and the count "c22b" of high-rate clock pulses from time "t22a" till time "t22b" are virtually set as $$c22a = c21a - (c21d - c21a) = c21a \quad (1)$$

and $$c22b = (c21d - c20d) - (c21d - c21b) = c21b - c20d \quad (2)$$

In equation (2), the count "c22b" is not always guaranteed to be positive. If "c22a" is negative, a correction process of adding "ctmp" to "c22b" and subtracting "1" from "c22b" is executed to obtain the final value.

A value slightly smaller than "c22a" is stored as the time of start of the next oscillation of the high-rate clock oscillator 17. When the receiving operation has been proceeded until the end of reception of the pertinent signal, the timing generator 19 stops the operation of the high-rate clock oscillator 17, the radio receiver 15 and the demodulator 16.

The timing generator 19 monitors the count of low-rate clock pulses. The timing generator 19 starts the high-rate clock oscillator 17 again at the timing of start of oscillation of the high-rate clock oscillator 17 with count of low-rate clock pulses slightly smaller than "c22a".

The timing generator 19 controls the signal reception such that the demodulation clock rises when the counts of the low- and high-rate clock oscillators 18 and 17 coincides with "c22a" and "c22b", respectively.

Prior to the start of the intermittent receiving operation, continuous reception for executing the intermittent receiving process is normally executed. In this continuous receiving process, an optimum opposite party station is selected. This selecting process is executed according to the received electric field value and data contained in the received signal. Further, control for starting intermittent receiving operation to be described later is executed.

In the intermittent receiving state, time estimation is done according to the count at the time of the immediately preceding receiving process. The immediately preceding count is calculated in the immediately preceding receiving operation. With the above procedure according to the present invention, the following process is executed at the start of the intermittent receiving operation.

In normal operation, a receiving process for a plurality of signals is required before the start of the intermittent receiving operation. The receiving process for a plurality of signals is realized by a continuous operation of the receiver. In the embodiment of the intermittent receiving system, the intermittent receiving operation is started after a similar receiving process.

In a continuously receiving state, with the execution of operation with respect to a particular position of received signal, the intermittent receiving interval is expressed as the difference between first and second stored counts. The Intermittent receiving interval is calculated according to the numbers "cso" and "ch0" of low- and high-rate clock pulses.

The first stored counts are the counts of low- and high-rate clock pulses which are stored in synchronism to the rise of the reception clock at a given time instant of a time section, in which the received signal is present.

The second stored counts are the counts of low- and high-rate clock pulses at an instant when the same number of reception clock pulses as from the beginning of the received signal till a particular instant of the received signal.

When the operation goes over the intermittent receiving operation, the low-rate clock pulse count of a time corresponding to time "t21a" a first intermittently received signal is set to "cs0–cs0d" from the above counts "cs0", "ch0", "cs0d" and "ch0d". The high-rate clock pulse count of a time corresponding to time "t21b" is set to "ch0–ch0d". With these count settings, the intermittent receiving operation noted above is executed.

When count "ch0–ch0d" is negative, like the case when the intermittent receiving operation is in force, "ctmp" is added to "ch0–ch0d", and the difference of "1" from "cs0–cs0d" is used in the operation.

FIGS. 3A and 3B are time charts illustrating prior art examples of intermittent receiving operations. FIG. 3C is an example of the intermittent receiving operation of the present invention.

FIG. 3A shows a prior art example of operation. As shown in the Figure, in this case the intermittent reception is executed without interruption of the high-rate clock.

In this case, an accurate and stable oscillator is used for the high-rate clock. The received signal start timing is set with reference to the count of "HCK". At the start of the reception, the setting of the initial demodulation clock phase and receiving circuit operation timing control are executed. In the non-receiving interval of time, the oscillating operation of the high-rate clock generator is not interrupted. High current consumption is therefore inevitable.

FIG. 3B shows a different prior art example of operation. As shown in the Figure, the intermittent receiving is executed on the basis of the low-rate clock pulse count, although the high-rate clock generator is interrupted.

In this instance, the receiving operation timing control is executed by estimating a rough reception start timing according to the count corresponding to the received signal start timing. No initial demodulation clock phase is set, and level-up of the demodulation clock generator in the demodulator is realized. This means that the receiving system circuit and the high-rate clock generator should be in duty service operation for longer time than the received signal, inevitably resulting in high current consumption.

In addition, when the bit synchronizing signal portion in the leading portion of the received signal is scanty as in PDC, receiving errors are readily liable compared to the system shown in FIG. 3A and the embodiment of the invention, although level-up of the demodulation clock 19 generator in the demodulator 16 is realized.

FIG. 3C shows an example of operation of the embodiment of the intermittent receiving system according to the present invention. As described above, the counts of high- and low-rate clock pulses are combined for executing the setting the initial base of the demodulation clock at the start of signal reception and the operation timing control of the receiving circuit.

In this case, even with the intermittent operation of the high-rate clock oscillator 17 the power supply of the receiving system circuit is controlled in a timed relation to the leading portion of the received signal during the intermittent reception. Also, even where the signal portion for the bit synchronization of the leading portion of the received signal is scanty, no, level-up of the bit synchronizing circuit in the demodulating circuit 16 is necessary. The reception clock reproducing process thus can be reliably executed.

The embodiment of the intermittent receiving system realizes the receiving performance and the minimum necessary receiver operation time. The current consumption in the operation of the high-rate clock oscillator 17 during non-receiving time is greatly suppressed. The non-operation period of the high-rate clock oscillator 17 is thus extended.

Now, a second embodiment of the intermittent receiving system according to the present invention will be described. This embodiment of the intermittent receiving system copes with the case when the receiving process is not correctly executed. This embodiment of the intermittent receiving system includes a control means, which checks whether the receiving process has been accurately executed and, in the case of the failure of continuous execution of accurate receiving process, the synchronization of the received signal is taken afresh.

In addition to the count storing means of the timing generator 19 in the first embodiment, this embodiment also includes a control means for taking the synchronization of received signal afresh. This control means operate such that, when the low-rate clock counter has not been reset with timing corresponding to times "t21d" and "t22d" of particular instants of the received signal, it executes control for storing count "cng" of low-rate clock pulses immediately after times "t21e" and "t22e".

When the count of low-rate clock pulses reaches "cng", the accurate receiving process is not executed. At this time, the control means judges that the reaching of the particular instants by the received signal can not be confirmed, and calculates a count for the next receiving process.

The operation of the embodiment in the intermittent receiving state will now be described. Referring to the Figure, when particular instant (UW) of received signal is not detected at time "t21d", the above control is started at time "t21e".

The counts "c21d" and "c21c" are stored at the rise of the demodulation clock. Also, "ctmp" is stored at the rise of the low-rate clock. Thus, each count is stored under the same condition as in the first embodiment described above.

At this time, the low-rate clock pulse count is reset to "0", and also "c22a" and "c22b" are calculated by the same procedure as in the first embodiment. "cng" is stored as the sum of "c21c" and "1".

When the particular instant (UW) of received signal is not detected continuously a predetermined number of times, the control means judges that the opposite party station selected as destination of the intermittent reception is inadequate. In this case, the intermittent receiving process is interrupted, and a new opposite party station is selected. When a new opposite party station is selected, the intermittent receiving operation is executed again after execution of the operation prior to its start.

The operation prior to the start of the intermittent receiving operation will now be described. In this embodiment, "1" is added to count "cs0" in the above first embodiment of the intermittent receiving operation, and the sum, i.e., "cng", is stored.

Except for the start of the intermittent receiving operation, entirely the same operation as in the above first embodiment is executed. In this embodiment of the intermittent receiving operation, the intermittent receiving operation is maintained in correspondence to an incidental non-signal receiving process during the intermittent reception.

A third embodiment of the intermittent receiving system according to the present invention will now be described. The above first and second embodiments of the intermittent receiving systems, are applied to in the case of the presence of an oscillator, which is oscillated at a sufficiently high rate compared to the high-rate clock and is in oscillation in a receiving time zone. In this embodiment, the oscillator is a high-rate clock oscillator 17 is used to substitute for the oscillator.

Requirements for selecting the substitution oscillator will now be described. A first requirement is the short-time stability in the cycle time of the intermittent receiving interval of the oscillator. A second requirement is the time value based on the product with the time interval corresponding to several clock pulses of the low-rate clock oscillator 18. A third requirement is the time value sum "t-error-sum" of the time value based on the short-time stability of the low-rate clock oscillator 18 in the time cycle of the intermittent receiving interval and the intermittent receiving interval and the time value corresponding to one clock pulse of the high-rate clock oscillator 17.

In the first embodiment, the time value "t-error-sum" may be such that it is less than the difference time value "t-error-max" between the phases of the demodulation clock and the receiving signal that ensures freedom from erroneous demodulation of the demodulator 16. The time value "t-error-sum" is usually set as a time value corresponding to several clock pulses of the high-rate clock oscillator 17.

In the second embodiment, the time value "t-error-sum" is set such that the time value as the product of the time value "t-error-sum" and the number of times of intermittent reception until judgment of deviation of the synchronization is within "t-error-max".

This embodiment is different in the constitutional requirement changes, and it operates in the same way as the above first and second embodiments of the intermittent receiving system. This embodiment of the intermittent receiving system is constructed inexpensively compared to the above first and second embodiments.

The intermittent receiving system according to the present invention can reduce power consumption in the intermittent receiving operation. This is based on the fact that the operation of the high-rate clock oscillator is synchronized to the demodulation clock rise timing.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An intermittent receiving system comprising:
   a demodulating unit for executing a demodulating process on a received radio signal, the demodulating unit generating a demodulation clock in the demodulating process;
   a first clock generating unit for generating a high-rate clock compared to the demodulation clock;
   a second clock generating unit for generating a low-rate clock compared to the demodulation clock; and
   a timing control unit for estimating a demodulation clock rise time corresponding to a reception timing in an intermittent reception and controlling the first clock unit substantially in synchronism to the demodulation clock rise time.

2. The intermittent receiving system according to claim 1, wherein the timing control unit calculates an intermittent receiving interval according to counts of pulses of the high- and low-rate clocks.

3. The intermittent receiving system according to claim 1, wherein the timing control unit causes the operation of the first clock generating unit to be started before the generation of the demodulation clock.

4. An intermittent receiving system comprising:
   a demodulating unit for executing a demodulating process on a received radio signal, the demodulating unit generating a demodulation clock in the demodulating process;
   a first clock generating unit for generating a high-rate clock compared to the demodulation clock;
   a second clock generating unit for generating a low-rate clock compared to the demodulation clock; and
   a timing control unit for estimating a demodulation clock rise time corresponding to a reception timing in an intermittent reception and controlling the first clock unit substantially in synchronism to the demodulation clock rise time,
   wherein the timing control unit determines an intermittent receiving interval by calculating an interval of a particular instant signal contained in the received radio signal according to counts of pulses of the high- and low-rate clocks.

5. The intermittent receiving system according to claim 4, wherein when the particular instant signal is not present at a leading portion of the received signal, the timing control unit calculates a relation between a leading portion of the particular instant signal and the leading portion of the received radio signal according to the counts of pulses of the low- and high-rate clocks and synchronizes the demodulation clock to the leading portion of the received signal by shifting the generation of the demodulation clock according to calculated counts.

6. An intermittent receiving method comprising:
   generating a demodulation clock;
   executing a demodulating process on a received radio signal;
   generating a high-rate clock at a high rate compared to the demodulation clock;
   generating a low-rate clock at a low rate compared to the demodulation clock;
   estimating a rise time of the demodulation clock corresponding to a reception timing in an intermittent reception interval; and
   substantially synchronizing the high-rate clock to the generation of the demodulation clock on the basis of the estimated rise time.

7. The intermittent receiving method according to claim 6, wherein the intermittent reception interval is calculated according to counts of the high- and low-rate clocks.

8. The intermittent receiving according to claim 6, wherein generation of the high-rate clock is started before the generation of the demodulation clock.

9. An intermittent receiving method comprising:

generating a demodulation clock;

executing a demodulating process on a received radio signal;

generating a high-rate clock at a high rate compared to the demodulation clock;

generating a low-rate clock at a low rate compared to the demodulation clock;

estimating a rise time of the demodulation clock corresponding to a reception timing in an intermittent reception interval; and substantially synchronizing the high-rate clock to the generation of the demodulation clock on the basis of the estimated rise time, wherein the intermittent reception interval is based on an interval of a particular instant signal contained in the received radio signal and is calculated according to counts of the pulses of the high- and low-rate clocks.

10. The intermittent receiving method according to claim 9, wherein calculating the intermittent reception interval includes:

calculating a relation between a leading portion of the particular instant signal and a leading portion of the received radio signal according to the counts of the pulses of the low- and high-rate clocks when the particular instant signal is not present at the leading portion of the received radio signal; and synchronizing the demodulation clock to the leading portion of the received radio signal by shifting the generation of the demodulation clock according to calculated counts.

11. An intermittent receiving system comprising:

a demodulating unit for executing a demodulating process on a received radio signal, the demodulating unit generating a demodulation clock in the demodulating process;

a first clock generating unit for generating a high-rate clock compared to the demodulation clock;

a second clock generating unit for generating a low-rate clock compared to the demodulation clock; and a timing control unit for estimating a demodulation clock rise time corresponding to a reception timing in an intermittent reception and controlling the first clock unit substantially in synchronism to the demodulation clock rise time, wherein the timing control unit calculates an intermittent receiving interval according to counts of pulses of the high- and low-rate clocks, and wherein the timing control unit determines the intermittent receiving interval by calculating an interval of a particular instant signal contained in the received radio signal according to the counts of pulses of the high- and low-rate clocks.

12. The intermittent receiving system according to claim 11, wherein when the particular instant signal is not present at a leading portion of the received signal, the timing control unit calculates a relation between a leading portion of the particular instant signal and the leading portion of the received radio signal according to the counts of pulses of the low- and high-rate clocks and synchronizes the demodulation clock to the leading portion of the received signal by shifting the generation of the demodulation clock according to calculated counts.

13. An intermittent receiving method comprising:

generating a demodulation clock;

executing a demodulating process on a received radio signal:

generating a high-rate clock at a high rate compared to the demodulation clock;

generating a low-rate clock at a low rate compared to the demodulation clock;

estimating a rise time of the demodulation clock corresponding to a reception timing in an intermittent reception interval; and substantially synchronizing the high-rate clock to the generation of the demodulation clock on the basis of the estimated rise time, wherein the intermittent reception interval is calculated according to counts of the high- and low-rate clocks, and wherein the intermittent reception interval is based on an interval of a particular instant signal contained in the received radio signal and is calculated according to the counts of the pulses of the high- and low-rate clocks.

14. The intermittent receiving method according to claim 13, wherein calculating the intermittent reception interval includes:

calculating a relation between a leading portion of the particular instant signal and a leading portion of the received radio signal according to the counts of the pulses of the low- and high-rate clocks when the particular instant signal is not present at the leading portion of the received radio signal; and synchronizing the demodulation clock to the leading portion of the received radio signal by shifting the generation of the demodulation clock according to calculated counts.

* * * * *